(12) United States Patent
Koizumi

(10) Patent No.: US 8,798,179 B2
(45) Date of Patent: Aug. 5, 2014

(54) RADIO COMMUNICATION DEVICE

(75) Inventor: Manabu Koizumi, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 13/576,140

(22) PCT Filed: Feb. 2, 2011

(86) PCT No.: PCT/JP2011/052132
§ 371 (c)(1),
(2), (4) Date: Jul. 30, 2012

(87) PCT Pub. No.: WO2011/096427
PCT Pub. Date: Aug. 11, 2011

(65) Prior Publication Data
US 2012/0314807 A1  Dec. 13, 2012

(30) Foreign Application Priority Data

Feb. 2, 2010 (JP) .................................. 2010-021381

(51) Int. Cl.
*H04K 1/10* (2006.01)
*H04W 4/00* (2009.01)
*H04L 12/28* (2006.01)

(52) U.S. Cl.
USPC ............................ 375/260; 370/338; 370/400

(58) Field of Classification Search
USPC .................................. 375/260; 370/338, 400
See application file for complete search history.

(56) References Cited

U.S. PATENT DOCUMENTS

| 7,427,895 | B1* | 9/2008 | Okubo et al. | 330/124 R |
| 2003/0060227 | A1* | 3/2003 | Sekine et al. | 455/550 |
| 2005/0221752 | A1* | 10/2005 | Jamieson et al. | 455/1 |
| 2006/0114866 | A1* | 6/2006 | Kim et al. | 370/338 |
| 2006/0181514 | A1* | 8/2006 | Newman | 345/168 |
| 2007/0259629 | A1* | 11/2007 | Lee et al. | 455/127.1 |
| 2008/0008109 | A1* | 1/2008 | Ollis | 370/310 |
| 2008/0069118 | A1* | 3/2008 | Monier | 370/400 |
| 2009/0253385 | A1* | 10/2009 | Dent et al. | 455/83 |

FOREIGN PATENT DOCUMENTS

| JP | 06-311134 | | 11/1994 |
| JP | 2006-197545 | A | 7/2006 |
| JP | 2006-340166 | A | 12/2006 |
| WO | 2006/059372 | A1 | 6/2006 |
| WO | 20061059372 | A1 | 6/2006 |

OTHER PUBLICATIONS

An Office Action issued by the Korean Patent Office on Feb. 17, 2014, which corresponds to Korean Patent Application No. 10-2012-7021216 and is related to U.S. Appl. No. 13/576,140; with English language concise explanation.

(Continued)

*Primary Examiner* — Leon-Viet Nguyen
*Assistant Examiner* — Sarah Hassan
(74) *Attorney, Agent, or Firm* — Studebaker & Brackett PC

(57) ABSTRACT

A radio communication device includes an amplification unit configured to amplify a transmission signal, an antenna transmitting an amplification signal amplified by the amplification unit, a detection unit configured to detect a reflection signal that is the amplification signal reflected from a side of the antenna, and a correction processing unit configured to correct the transmission signal, wherein the correction processing unit is configured to correct the transmission signal based on the reflection signal when installation of a filter through which the amplification signal passes is recognized.

5 Claims, 7 Drawing Sheets

(56) References Cited

OTHER PUBLICATIONS

International Search Report; PCT/JP2011/052132; Mar. 1, 2011.

An Office Action "Notice of Reasons for Rejection" issued by the Japanese Patent Office dated on May 28, 2013, which corresponds to Japanese Patent Application No. 2011-552795 and is related to U.S. Appl. No. 13/576,140; with translation.

* cited by examiner

RADIO COMMUNICATION DEVICE

TECHNICAL FIELD

The present invention relates to a radio communication device.

This application claims priority to and the benefits of Japanese Patent Application No. 2010-021381 filed on Feb. 2, 2010, the disclosure of which is incorporated herein by reference.

BACKGROUND ART

In Patent Document 1, orthogonal frequency-division multiplexing (referred to as OFDM below) that is one of multicarrier communication systems is designed to correct deviation caused by a low-pass filter (referred to as LPF below) that suppresses a loop-back signal generated from a digital analog conversion circuit, thereby reducing distortion of an OFDM signal. Specifically, an OFDM signal with low distortion is generated by correcting deviation in advance according to the attenuation characteristic and the group delay characteristic of an LPF circuit. For the method disclosed in Patent Document 1, it is necessary to know characteristics of a filter in advance, but there are cases in which the filter characteristics are not known in advance.

PRIOR ART DOCUMENT

Patent Document

Patent Document 1 Japanese Unexamined Patent Application, First Publication No. H06-311134

DISCLOSURE OF INVENTION

Problems to be Solved by the Invention

For example, when a radio communication device is installed and then a radio wave of a desired signal for transmission interferes to generate spurious, it is further necessary to install an external filter on an antenna. In this case, the newly installed external filter deteriorates deviation of amplitude and phase in a band used for communication, which causes deterioration of communication quality.

The present invention has been achieved in view of the above circumstances, and it is an object of the present invention to improve communication quality even when characteristics of a desired signal for transmission vary.

Means for Solving the Problem

A radio communication device according to an aspect of the present invention includes an amplification unit configured to amplify a transmission signal; an antenna transmitting an amplification signal amplified by the amplification unit; a detection unit configured to detect a reflection signal that is the amplification signal reflected from a side of the antenna; and a correction processing unit configured to correct the transmission signal, wherein the correction processing unit is configured to correct the transmission signal based on the reflection signal when installation of a filter through which the amplification signal passes is recognized.

In the radio communication device of the aspect of the present invention, the reflection signal may be a signal reflected by the filter.

The radio communication device of the aspect of the present invention may further include a coupled line configured to receive the reflection signal, and the filter may be disposed between the antenna and the coupled line.

In the radio communication device of the aspect of the present invention, the correction processing unit may be configured to recognize the installation of the filter when it is informed of manipulation of an operator.

In the radio communication device of the aspect of the present invention, the correction processing unit may be configured to recognize the installation of the filter based on an analysis result of the reflection signal.

In the radio communication device of the aspect of the present invention, the transmission signal may be a multicarrier signal including a plurality of subcarrier signals, and the correction processing unit may be configured to correct a phase and an amplitude of a specific subcarrier signal of the multicarrier signal based on the reflection signal.

In the radio communication device of the aspect of the present invention, the correction processing unit may be configured to correct a phase of a subcarrier signal having delay based on the reflection signal.

Effects of the Invention

According to the present invention, even when characteristics of a desired signal for transmission vary, it is possible to improve communication quality.

EMBODIMENTS FOR CARRYING OUT THE INVENTION

Figure 1:
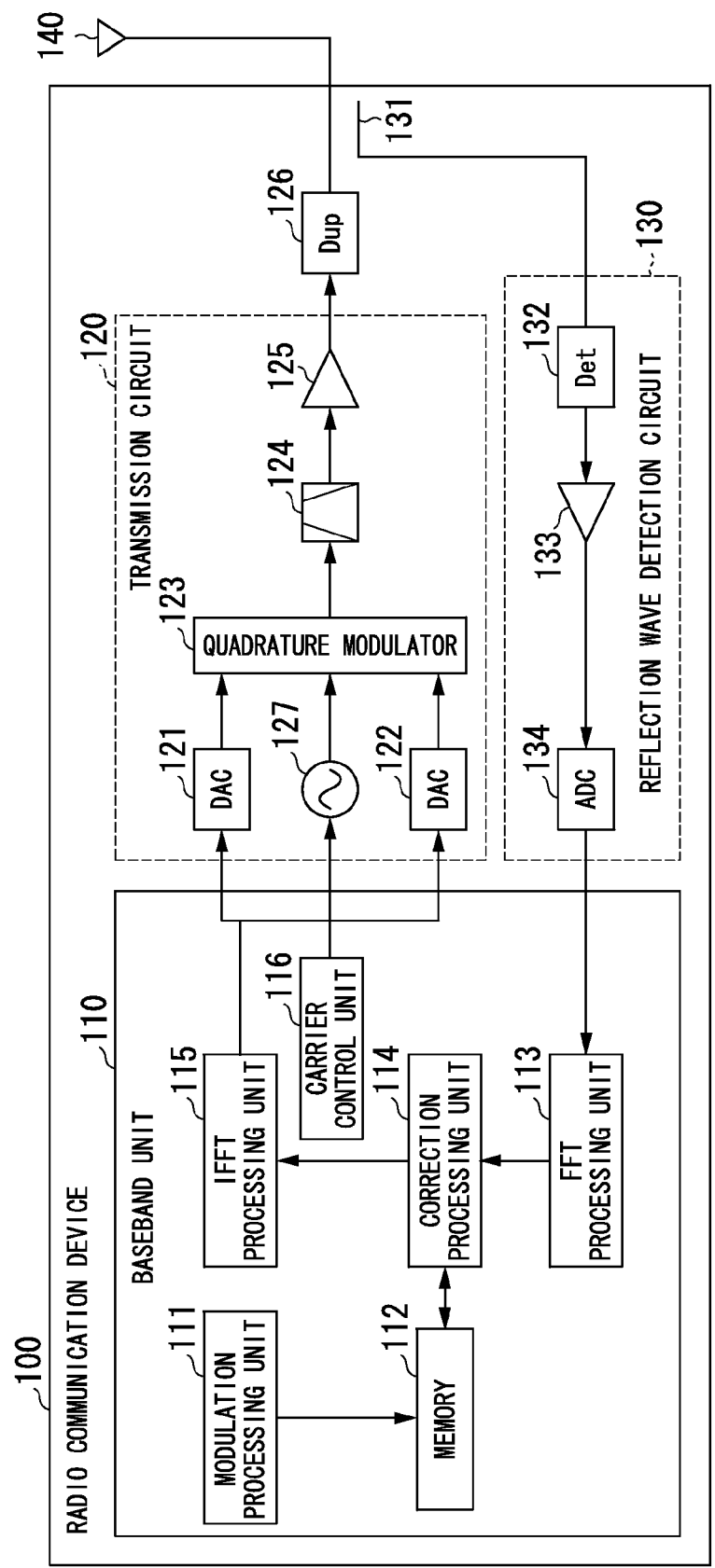
FIG. 1 is a block configuration diagram of a radio communication device according to an embodiment of the present invention.

Hereinafter, embodiments of the present invention will be described in detail with reference to the drawings. FIG. 1 is a block configuration diagram of a radio communication device according to an embodiment of the present invention. A radio communication device 100 includes a baseband unit 110, a transmission circuit 120, a duplexer (Dup) 126, a reflection wave detection circuit 130, a coupled line 131 and an antenna 140. In the present embodiment, the radio communication device 100 is described as a stationary radio communication device such as a base station.

The antenna 140 transmits a transmission signal, which is output from the transmission circuit 120 through the duplexer 126, to another radio terminal (not shown) as a transmission wave. When the antenna 140 transmits the transmission signal, a reflection signal reflected from a side of the antenna 140 is input to the radio communication device 100 through a line that connects the radio communication device 100 with the antenna 140.

The coupled line 131 separates the transmission signal input from the transmission circuit 120 and the reflection signal reflected from the side of the antenna 140, and outputs the transmission signal to the antenna 140 and the reflection signal to the reflection wave detection circuit 130.

In the present embodiment, OFDM of a frequency division duplex (FDD) scheme is employed, and thus the duplexer 126 electrically separates a transmission path and a reception path.

The duplexer 126 separates the transmission signal and a reception signal. Here, description of a reception circuit that processes the reception signal in the radio communication device 100 is omitted. Also, when a time division duplex (TDD) scheme is used, the duplexer 126 switches between transmission and reception by a switch at predetermined time intervals.

After the radio communication device 100 is installed, a band pass filter for suppressing an unnecessary (spurious) wave of a surrounding band of a necessary band of a desired signal may be installed between the coupled line 131 and the antenna 140.

Figure 7A:
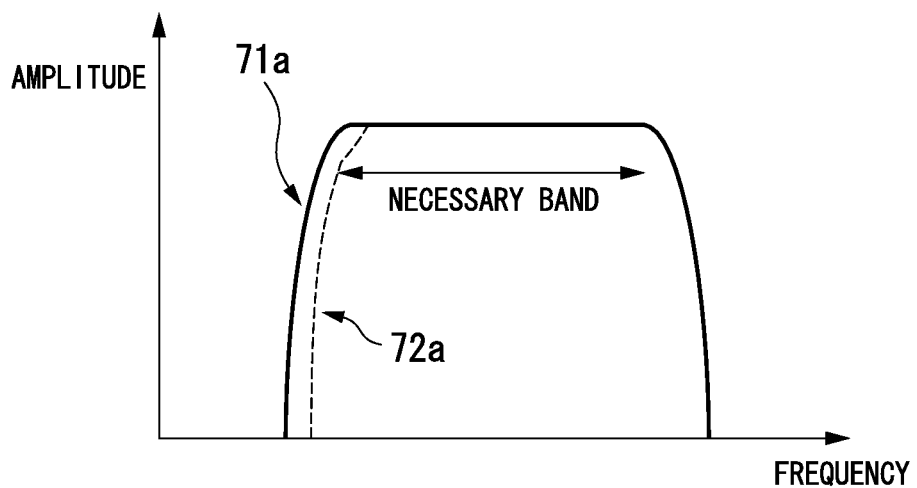
FIG. 7A is a diagram showing an example of a change in amplitude and group delay before and after suppression of spurious in a surrounding band.
Figure 7B:
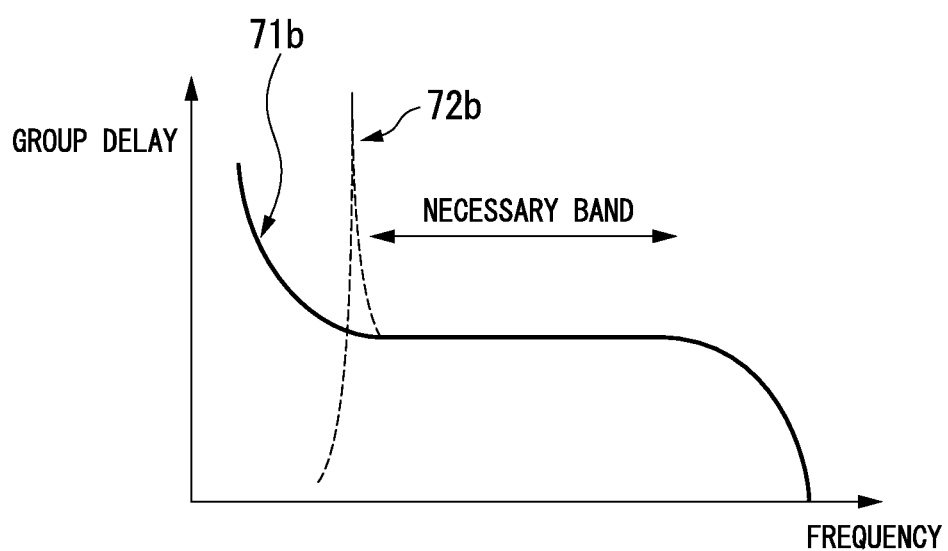
FIG. 7B is a diagram showing another example of a change in amplitude and group delay before and after suppression of spurious in a surrounding band.

When such a filter is used, deviation of amplitude and phase in a band used for communication deteriorates. As the detailed deterioration, deterioration of amplitude and a group delay characteristic after the spurious of a surrounding band is suppressed will be described using FIGS. 7A and 7B. In an example shown in FIG. 7A, it can be seen that a band of a post-filter characteristic 72a narrows compared with a pre-filter-processing characteristic 71a. In an example shown in FIG. 7B, it can be seen that group delay of a post-filter characteristic 72b increases in a low-frequency region compared with a pre-filter-processing characteristic 71b.

It has been known that, when spurious is suppressed using a filter in this manner, a group delay characteristic is distorted, and as a result, communication quality of a single-carrier communication system deteriorates. In order to reduce the deterioration in communication quality, a method of avoiding or prohibiting allocation of a deteriorated channel using a multi-carrier communication system has been used. In addition to the method of avoiding or prohibiting allocation of a deteriorated subcarrier, a method of setting a low modulation scheme for a deteriorated subcarrier has been used in OFDM, but there was no preferred method.

The baseband unit 110 includes a modulation processing unit 111, a memory 112, an FFT processing unit 113, a correction processing unit 114, an IFFT processing unit 115 and a carrier control unit 116.

The modulation processing unit 111 first divides a data string (e.g., a binary data string) into N pieces of parallel data through demultiplexing, modulates each piece of parallel data by quadrature amplitude modulation (referred to as QAM below), phase-shift keying (referred to as PSK below) or the like, and stores the modulated signal (a signal in the frequency domain as a complex number) in the memory 112.

In OFDM, a signal $\Phi$ modulated by the modulation processing unit 111 is represented by Equation (1) below.

$$\Phi = \sum_{j=0}^{N-1} \phi_j \qquad (1)$$

Here, N is the number of carriers, and $\phi_j$ (j is an integer from 0 to N−1) is a signal of each subcarrier.

The FFT processing unit 113 outputs a reflection signal (complex number) that is output from the reflection wave detection circuit 130 and subjected to FFT processing using a fast Fourier transform (referred to as FFT below) to the correction processing unit 144.

Specifically, the FFT processing unit 113 performs FFT processing on N reflection signals $x_k$ (k is an integer from 0 to N−1) and thereby calculates N complex sequences (k is an integer from 0 to N−1) from Equation (2) below.

$$X_j = \sum_{k=0}^{N-1} x_k e^{-\frac{2\pi i}{N} jk} \qquad (2)$$

Here, e is a Napier's number, i is an imaginary unit, $\pi$ is the ratio of the circumference of a circle to its diameter, and j is an integer from 0 to N−1.

The correction processing unit 114 corrects each subcarrier of the transmission signal based on the reflection signal output from the FFT processing unit 113. Details are described below. A modulation signal $\phi_j$ (j is an integer from 0 to N−1) of each pre-correction subcarrier that is read out from the memory 112 by the correction processing unit 114 is represented by Equation (3) below.

$$\phi_j = A_s(j) \times \exp(i\theta_s(j)) \qquad (3)$$

Figure 2A:
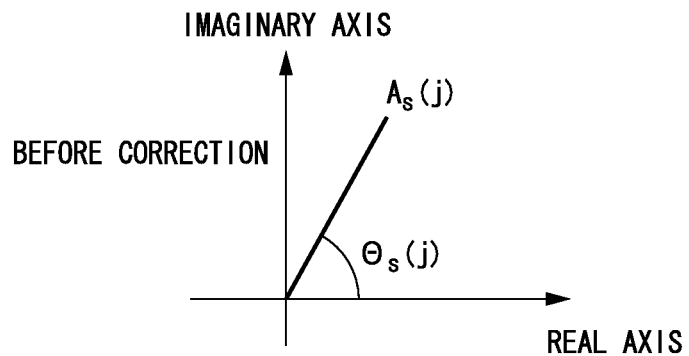
FIG. 2A is a diagram showing a pre-correction signal on a complex plane.

Here, $A_s(j)$ is an amplitude of the modulation signal $\phi_j$ of the subcarrier, and $\theta_s(j)$ is a phase of the modulation signal $\phi_j$ of the subcarrier. The modulation signal $\phi_j$ of the pre-correction subcarrier is represented in a complex plane as shown in FIG. 2A. A reflection signal $X_j$ (j is an integer from 0 to N−1) of a subcarrier output from the FFT processing unit 113 is represented by Equation (4) below.

$$X_j = A_r(j) \times \exp(i\theta_r(j)) \qquad (4)$$

Figure 2B:
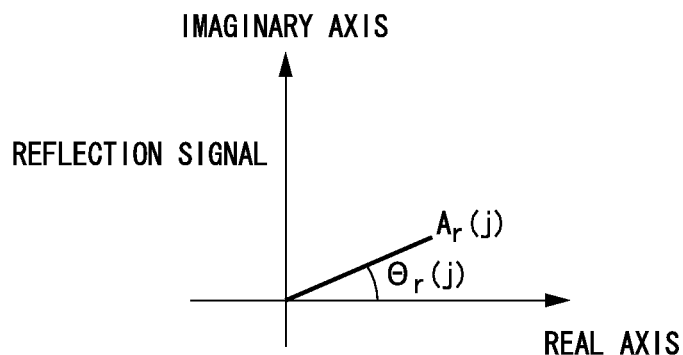
FIG. 2B is a diagram showing a reflection signal on the complex plane.

$A_r(j)$ is an amplitude of the reflection signal $X_j$ of the subcarrier, and $\theta_r(j)$ is a phase of the reflection signal $X_j$ of the subcarrier. The reflection signal $X_j$ of the subcarrier is represented in the complex plane as shown in FIG. 2B.

The correction processing unit 114 calculates a correction coefficient $c_j$ of each subcarrier from the subcarrier signal $X_j$ (j is an integer from 0 to N−1) of the reflection wave output from the FFT processing unit 113 and the modulation signal $\phi_j$ (j is an integer from 0 to N−1) of each OFDM subcarrier read out from the memory 112 using Equation (5) below, and stores the calculated correction coefficient $c_j$ of each subcarrier in the memory 112.

$$c_j = X_j/\phi_j = A_s(j)/A_r(j) \times \exp(i(\theta_s(j) - \theta_r(j))) \qquad (5)$$

Figure 2C:
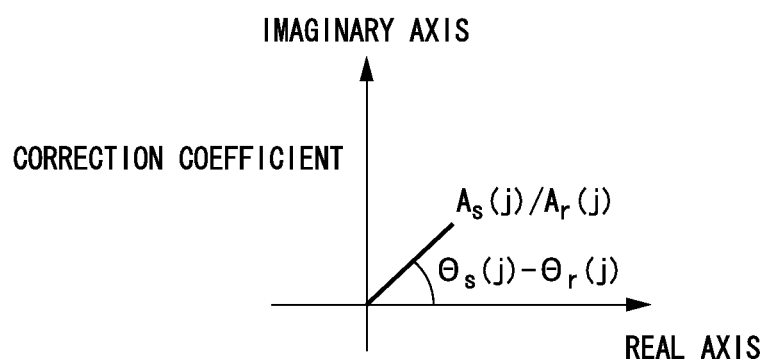
FIG. 2C is a diagram showing a correction coefficient on the complex plane.

Here, the amount of correction in an amplitude direction is $A_s(j)/A_r(j)$, the amount of correction of a phase component is $\theta_s(j) - \theta_r(j)$, and the correction coefficient is represented in the complex plane as shown in FIG. 2C. Both amplitude and phase can be corrected by a correction coefficient.

The correction processing unit 114 calculates a post-correction signal $\Phi_{coeff}$ from the calculated correction coefficient $c_j$ and the modulation signal $\phi_j$ of each OFDM subcarrier using Equation (6) below, and outputs the calculated post-correction signal $\Phi_{coeff}$ to the IFFT processing unit 115.

$$\Phi_{coeff} = \sum_{j=0}^{N-1} c_j \phi_j \qquad (6)$$

The IFFT processing unit 115 performs an inverse FFT (referred to as IFFT below) on the correction signal $\Phi_{coeff}$ output from the correction processing unit 114, thereby converting the correction signal $\Phi_{coeff}$ into an OFDM signal in the time domain.

Also, the IFFT processing unit 115 inserts a cyclic prefix (CP) between respective OFDM signals as a guide interval, and outputs an in-phase signal Ito a digital analog converter (DAC) 121 and a quadrature phase signal Q to a DAC 122.

The transmission circuit 120 includes the DAC 121, the DAC 122, a quadrature modulator 123, a band pass filter 124, a high output power amplifier 125, and a frequency oscillator 127.

The DAC 121 converts the in-phase signal i output from the IFFT processing unit 115 from a digital signal to an analog signal, and outputs the analog signal to the quadrature modulator 123.

The DAC 122 converts the quadrature phase signal Q output from the IFFT processing unit 115 from a digital signal to an analog signal, and outputs the analog signal to the quadrature modulator 123.

The frequency oscillator 127 (includes a phase-locked loop (PLL) not shown) generates a carrier wave of a predetermined band set by the carrier control unit 116, and outputs the generated carrier wave to the quadrature modulator 123.

The quadrature modulator 123 generates the transmission signal by modulating the analog signal input from the DAC 121 and the analog signal output from the DAC 122 using a cosine wave and a sine wave of the carrier wave output from the frequency oscillator 127, and outputs the transmission signal to the band pass filter 124.

The band pass filter 124 generates a signal from which unnecessary components are removed by applying the filter to the synthesis signal output from the quadrature modulator 123, and outputs the signal from which the unnecessary components have been removed to the high output power amplifier 125.

The high output power amplifier 125 amplifies the signal, from which the unnecessary components have been removed and which is input from the band pass filter 124, with a predetermined gain to a power required for outputting, and then outputs the amplified signal to the duplexer 126.

The reflection wave detection circuit 130 includes a detector 132 (Det), an amplifier 133, and an analog digital converter (ADC) 134.

The detector 132 (Det) detects a reflection signal that is reflected from the side of the antenna 140 and input through the coupled line 131, and outputs the detected reflection signal to the amplifier 133.

The amplifier 133 amplifies the reflection signal output from the detector 132 to a level required by the ADC 134, and outputs the amplified reflection signal to the ADC 134.

The ADC 134 converts the reflection signal (analog signal) output from the amplifier 133 into a digital signal, and outputs the digital signal to the FFT processing unit 113.

Figure 3:
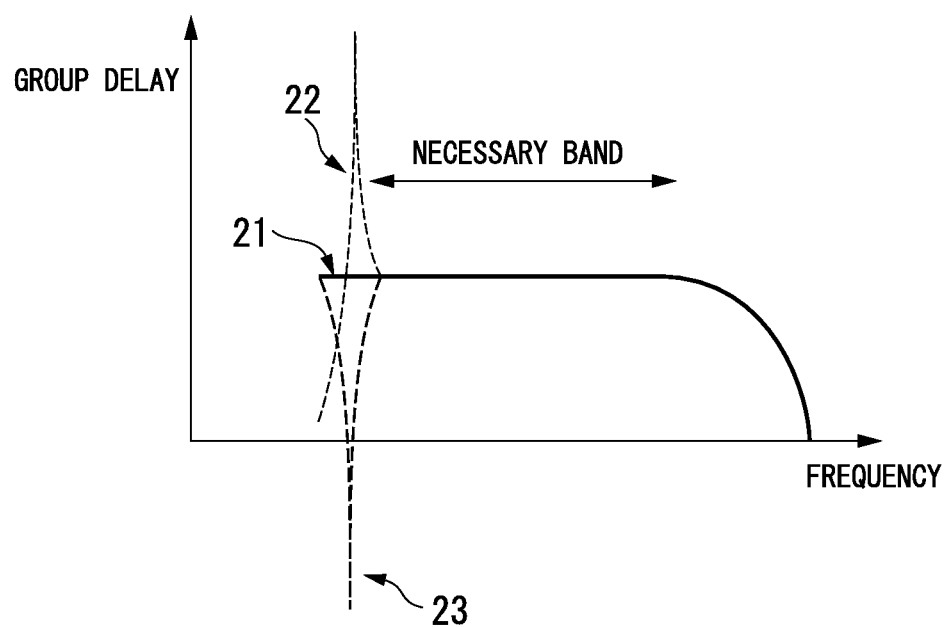
FIG. 3 is a diagram illustrating a degraded fraction and the amount of correction of group delay.

Details of processing of the correction processing unit 114 will be described below using FIG. 3 to FIG. 5. First, using FIG. 3, a degraded fraction and the amount of correction of group delay will be described. In this drawing, a horizontal axis is frequency, and a vertical axis is group delay.

When a filter that cuts a low frequency region is newly installed between the coupled line 131 and the antenna 140 in order to suppress close spurious, group delay of the filter increases in a low frequency region. In this manner, a peak of group delay (a degraded fraction 22 of the group delay) as shown in FIG. 3 is observed.

The correction processing unit 114 determines to correct the degraded fraction 22 of the group delay of a subcarrier that becomes a correction target, calculates a correction coefficient from Equation (5) above, and multiplies a pre-correction signal of each subcarrier by a correction coefficient of the subcarrier using Equation (6), thereby changing the pre-correction signal of the subcarrier to a post-improvement group delay characteristic 21.

Figure 4A:
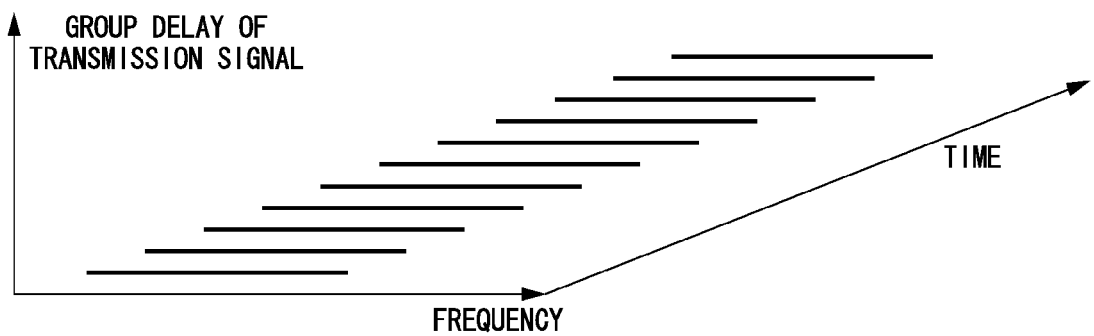
FIG. 4A is a diagram illustrating a group delay characteristic of a transmission signal.
Figure 4B:
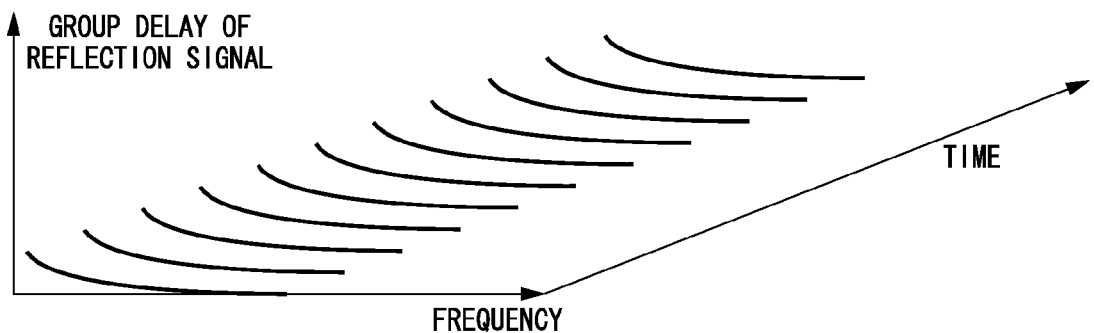
FIG. 4B is a diagram illustrating a group delay characteristic of a reflection signal.
Figure 4C:
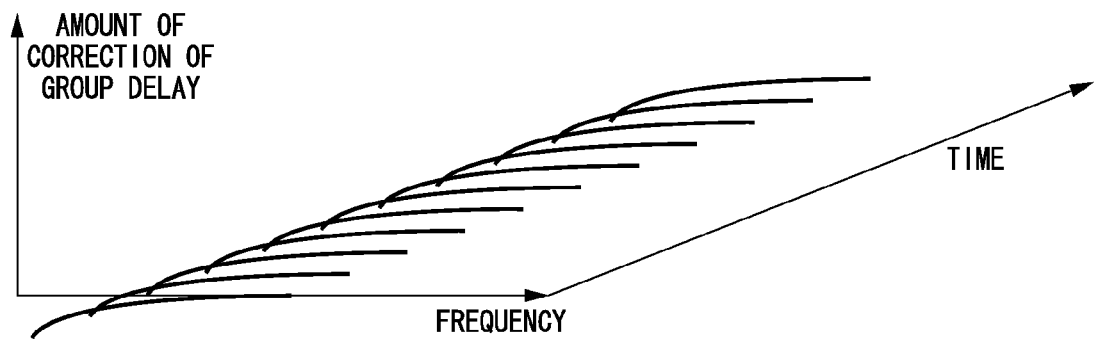
FIG. 4C is a diagram illustrating the amount of correction of group delay calculated by subtracting the group delay characteristic (FIG. 4B) of the reflection signal from the group delay characteristic (FIG. 4A) of the transmission signal.

Next, correction described in FIG. 3 will be described using FIGS. 4A, 4B, and 4C. In FIGS. 4A, 4B, and 4C, a horizontal axis is frequency, a vertical axis is group delay, and a third axis is time. FIG. 4A illustrates a group delay characteristic of a transmission signal, and in FIG. 4A, the transmission signal has the uniform group delay characteristic with respect to all frequencies. FIG. 4B illustrates a group delay characteristic of a reflection signal when a filter for suppressing spurious is additionally installed on an antenna. In FIG. 4B, group delay of the reflection signal increases in a low frequency band due to influence of the filter. FIG. 4C illustrates the amount of correction of group delay calculated by subtracting the group delay characteristic of the reflection signal from the group delay characteristic of the transmission signal.

Next, correction described in FIG. 3 will be described using FIG. 5. In FIG. 5, a horizontal axis is time, and a vertical axis is amplitude. This drawing shows an example in which the correction processing unit 114 performs correction, and thereby phases progress in connection with subcarrier 1 and subcarrier 2 (subcarriers that are correction targets) in a low frequency band that may deteriorate, and processing is not performed on subcarrier 3 and subcarrier 4 in a high frequency band. Specifically, the correction processing unit 114 performs correction, so that a phase of a pre-correction signal 41a of subcarrier 1 progresses, and the pre-correction signal 41a becomes a post-correction signal 41b. Likewise, the correction processing unit 114 performs correction, so that a phase of a pre-correction signal 42a of subcarrier 2 progresses, and the pre-correction signal 42a becomes a post-correction signal 42b. In addition, changes in phase are not made for signals of subcarrier 3 and subcarrier 4, and the signals remain as a signal 43 and a signal 44 respectively.

Figure 5:
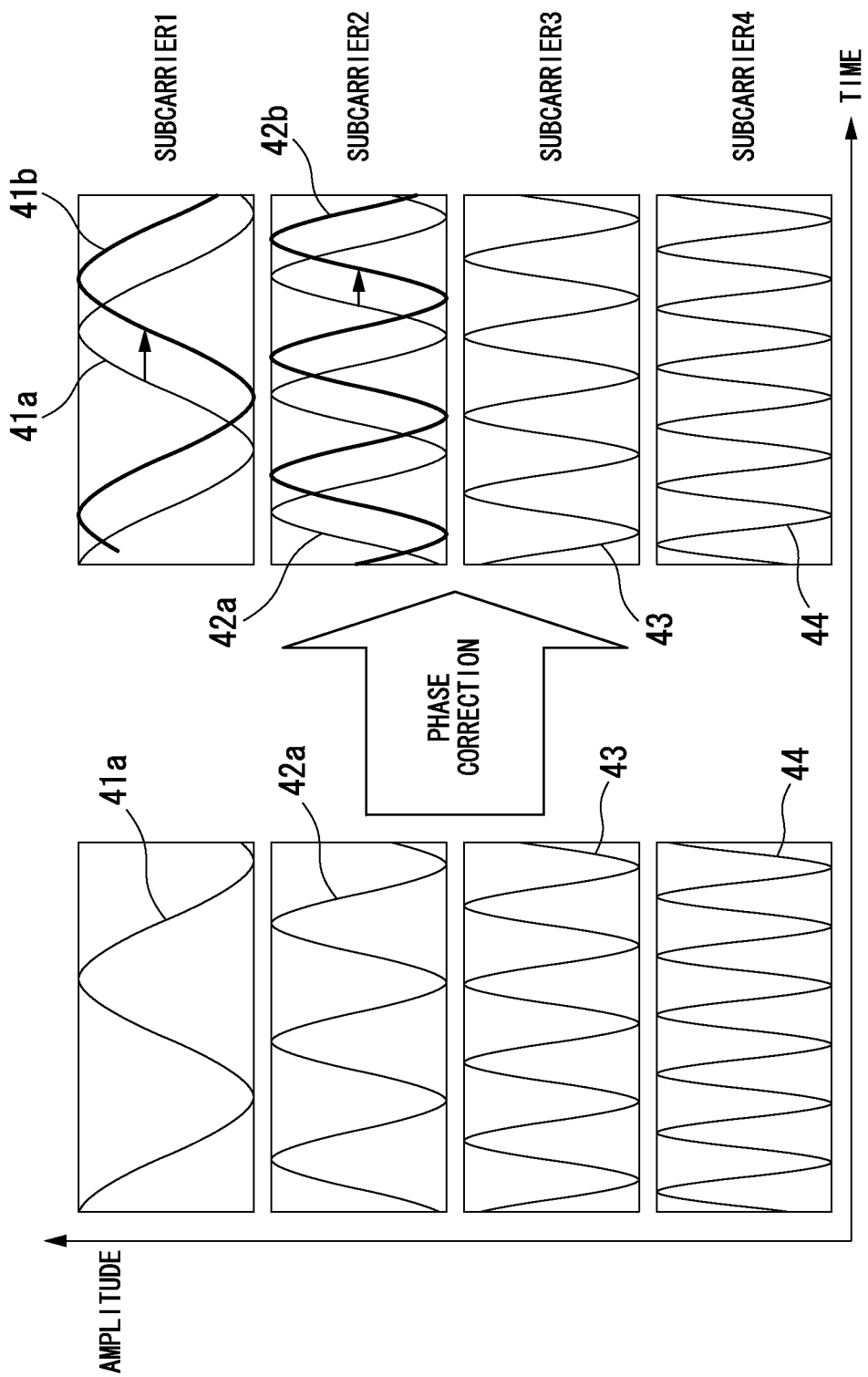
FIG. 5 is a diagram illustrating correction of phase on a time axis when group delay is in a low-frequency band.

As described above, the correction processing unit 114 performs phase correction as illustrated in FIG. 5 by multiplying a pre-correction signal of each subcarrier, which is a correction target, by a correction coefficient of Equation (5). In this manner, it is possible to improve a group delay characteristic.

Figure 6:
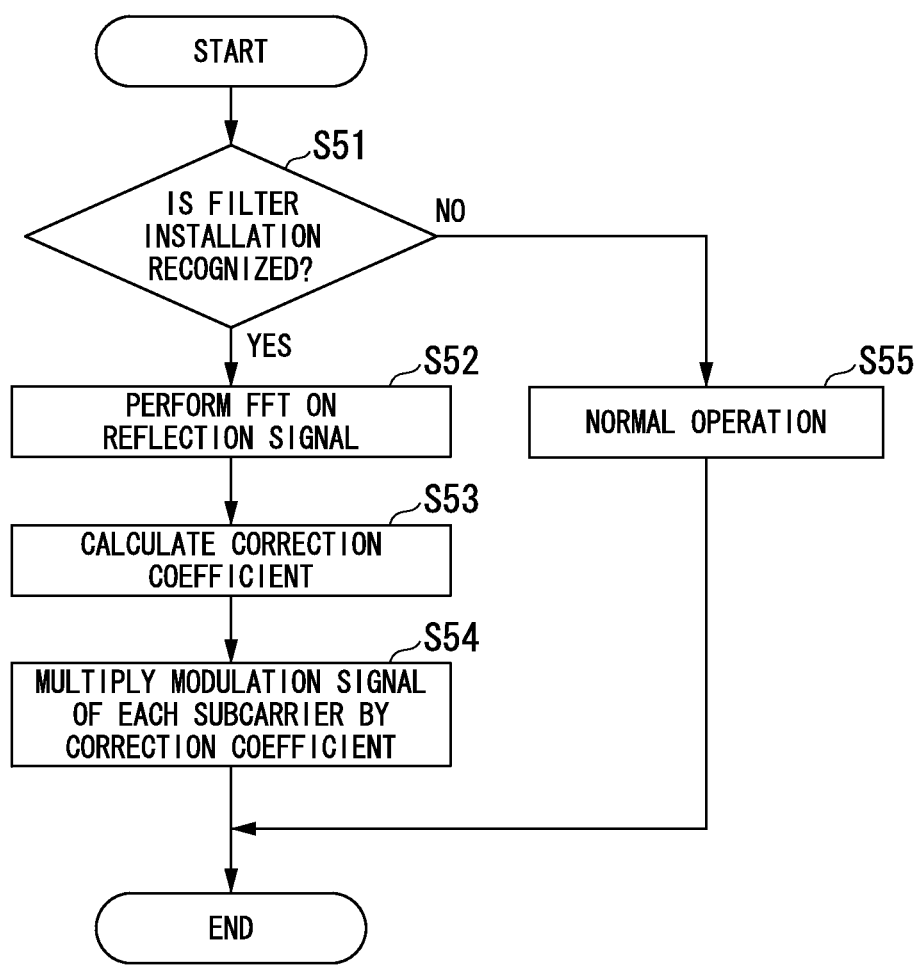
FIG. 6 is a flowchart of phase correction by a correction processing unit 114.

Processing flow of phase correction by the correction processing unit 114 will be described. FIG. 6 is a flowchart of phase correction by the correction processing unit 114.

First, the correction processing unit 114 checks whether or not an external filter is installed between the antenna 140 and the coupled line 131.

A method for the correction processing unit 114 to check installation of a filter will be described below.

For example, by manipulation of an operator through an input interface, the correction processing unit 114 may be informed of installation of a filter and recognize installation of a filter.

The correction processing unit 114 may recognize installation of a filter from characteristics of a reflection signal based on results obtained by analyzing the reflection signal subjected to FFT processing. At this time, the correction processing unit 114 may analyze a reflection signal obtained by performing FFT processing on a regularly-transmitted signal (e.g., broadcast channel or downlink shared channel in a communication scheme provided by Third Generation Partnership Project (3GPP)). Also, filter information on characteristics of an installed filter may be stored in advance in the memory 112, and the correction processing unit 114 may determine installation of the filter from the filter information and characteristics of a reflection signal.

When the correction processing unit 114 does not recognize that a filter is installed (No in step S51), as a normal operation, the correction processing unit 114 reads out a correction coefficient and a modulation signal calculated on a previous occasion from the memory 112, generates a correction signal by multiplying the modulation signal by the correction coefficient, and outputs the correction signal to the IFFT processing unit 115 (step S55).

When the correction processing unit 114 recognizes that a filter is installed on the side of the antenna 140 (Yes in step S51), the FFT processing unit 113 generates an FFT signal by performing FFT processing on a reflection signal input from the ADC 134, and outputs the FFT signal to the correction processing unit 114 (step S52). Subsequently, the correction processing unit 114 calculates a correction coefficient of each subcarrier from the FFT signal and the modulation signal read out from the memory 122 using Equation (5) above (step S53). Subsequently, the correction processing unit 114 calculates a correction signal by multiplying a modulation signal of each subcarrier by the calculated coefficient, and outputs the correction signal to the IFFT processing unit 115 (step S54). Then, the present processing ends.

As described above, the radio communication device 100 can correct group delay of a transmission signal using a reflection signal, and thereby can improve communication quality even when characteristics of the transmission signal vary after the radio communication device 100 is installed.

Although embodiments of the present invention have thus far been described in detail with reference to the drawings, the detailed configuration is not limited to these embodiments but includes design and the like within a scope that does not depart from the spirit of the present invention. A band pass filter for suppressing spurious installed on an antenna side is installed between a base station and the antenna when the radio communication device 100 is the base station. Also, when the base station is a type installed on a rooftop, the band pass filter may be installed inside a case of the base station.

INDUSTRIAL APPLICABILITY

According to the present invention, even when an unnecessary wave of a surrounding band of a necessary band is suppressed and characteristics of a desired signal for transmission vary, it is possible to improve communication quality.

DESCRIPTION OF THE REFERENCE SYMBOLS 100 radio communication device
110 baseband unit
111 modulation processing unit
112 memory
113 FFT processing unit
114 correction processing unit
115 IFFT processing unit
116 carrier control unit
120 transmission circuit
121 DAC
122 DAC
123 quadrature modulator
124 band pass filter
125 high output power amplifier
126 duplexer
127 frequency oscillator
130 reflection wave detection circuit
131 coupled line
132 detector
133 amplifier
134 ADC
140 antenna

The invention claimed is:

1. A radio communication device comprising:
an amplification unit configured to amplify a transmission signal;
an antenna transmitting an amplification signal amplified by the amplification unit;
a detection unit configured to detect a reflection signal that is the amplification signal reflected from a side of the antenna; and
a correction processing unit configured to correct the transmission signal,
wherein the correction processing unit is configured to correct the transmission signal based on the reflection signal when installation of a filter through which the amplification signal passes is recognized, and
the correction processing unit is configured to recognize the installation of the filter based on an analysis result of the reflection signal.

2. The radio communication device according to claim 1, wherein the reflection signal is a signal reflected by the filter.

3. The radio communication device according to claim 2, further comprising a coupled line receiving the reflection signal,
wherein the filter is disposed between the antenna and the coupled line.

4. The radio communication device according to claim 2, wherein the transmission signal is a multicarrier signal including a plurality of subcarrier signals, and
the correction processing unit is configured to correct a phase and an amplitude of a specific subcarrier signal of the multicarrier signal based on the reflection signal.

5. The radio communication device according to claim 4, wherein the correction processing unit is configured to correct a phase of a subcarrier signal having delay based on the reflection signal.

* * * * *